Jan. 25, 1966   J. R. BARRETT ETAL   3,230,860
MACHINE FOR CONVEYING MEAT SLICES THROUGH BRINE
Filed Jan. 16, 1961   4 Sheets-Sheet 1
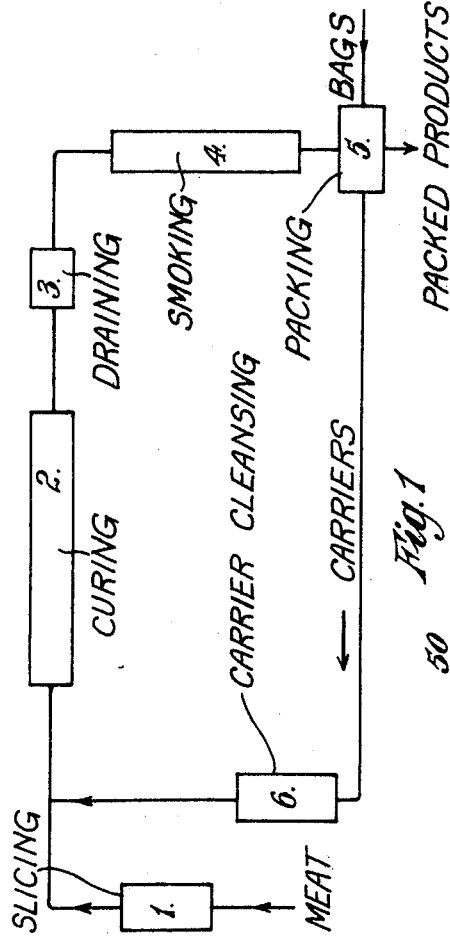
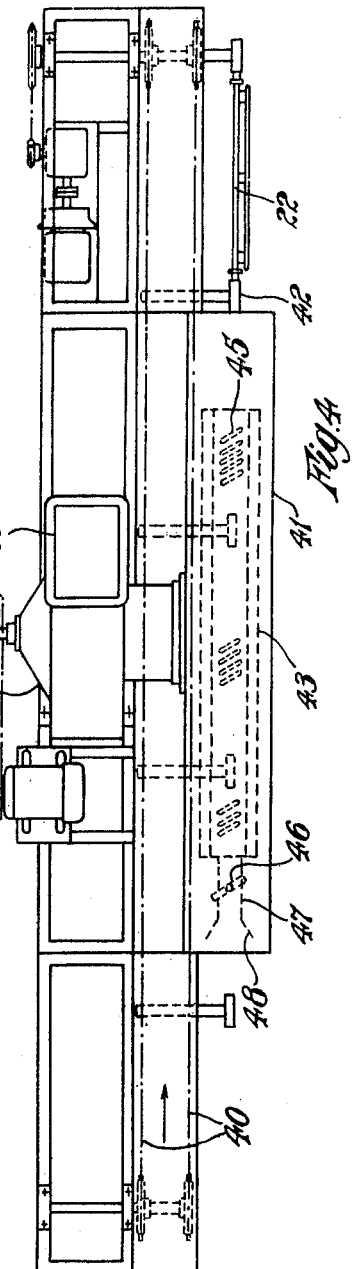
INVENTORS.
JAMES RICHARD BARRETT,
JOHN MERVYN DAVIES &
CAMPBELL GALBRAITH
BY
their ATTORNEYS

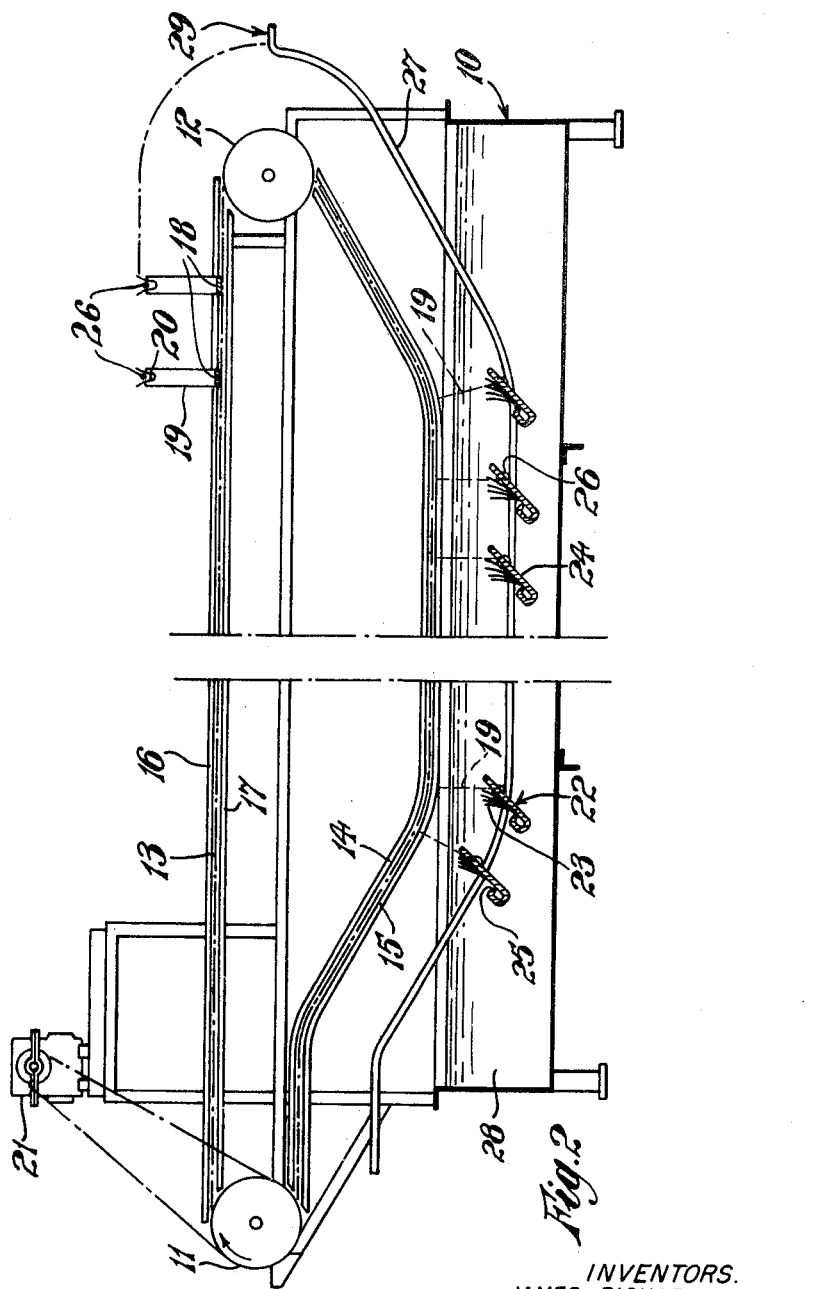

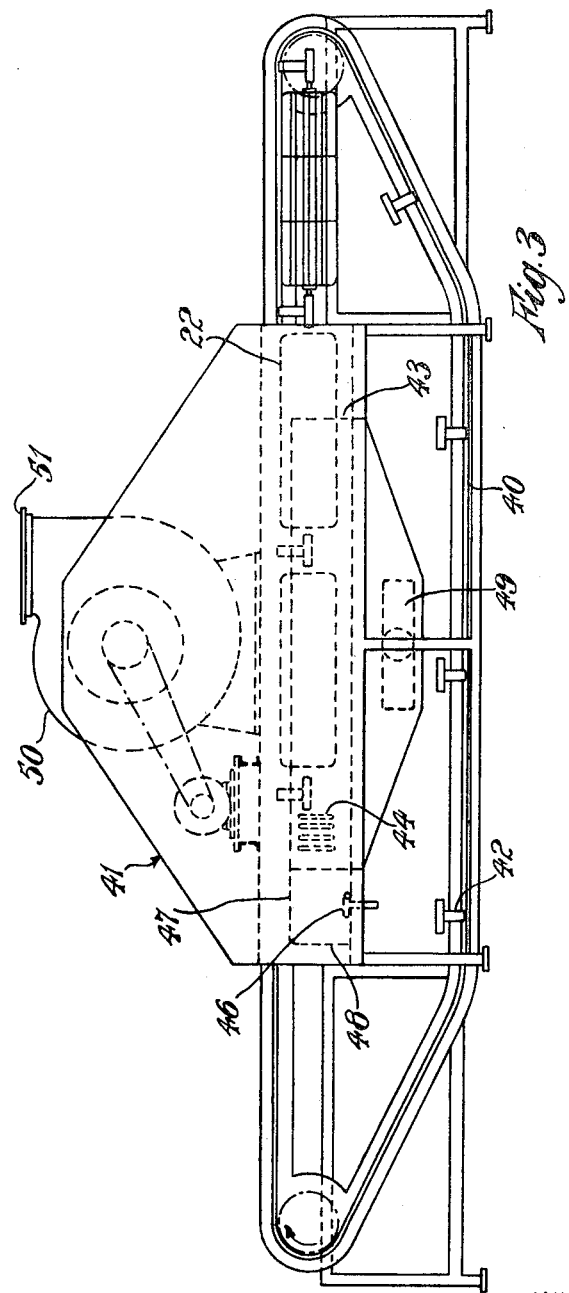

3,230,860
MACHINE FOR CONVEYING MEAT SLICES THROUGH BRINE

James Richard Barrett, Kendall Hill, Sharnbrook, John Mervyn Davies, Twickenham, and Campbell Galbraith, Bromham, England, assignors to Thomas J. Lipton, Inc., Englewood Cliffs, N.J., a corporation of Delaware
Filed Jan. 16, 1961, Ser. No. 87,736
Claims priority, application Great Britain, Jan. 19, 1960, 1,895/60
3 Claims. (Cl. 99—254)

The present invention relates to the preparation of food products especially meat products and is particularly concerned with the production of bacon and ham.

The curing of meat, as for instance in the preparation of bacon and ham, has been carried out from early times by methods which have become traditional in the industry. According to such methods, sides of bacon pigs are immersed in strong brine, containing other salts necessary or advantageous for the curing, notably alkali metal nitrates and nitrites. The sides are allowed to remain in the brine for a long time, generally about 5 days, and are then removed from the brine and allowed to mature in the air for a further period, generally about 10 days. An alternative process is dry-salting, in which salts are rubbed into the sides of dry meat and the meat is exposed to air for a long time, generally for some weeks. That such processes are so time-consuming is obviously disadvantageous, but it has been persistently believed in the industry that times of treatment of the order given above are essential to obtain the desired flavour, colour and shelf life in bacon and ham.

British Patent No. 848,014 shows how the production of bacon and ham can be greatly expedited by subjecting the meat in the form of slices to the action of a curing agent comprising brine containing nitrite ions and after such treatment allowing the slices to mature for a short period in the absence of free oxygen.

The present invention provides a particularly advantageous method of obtaining sliced cured meat especially bacon and ham. The invention also provides apparatus specially suitable for carrying out the process of the invention.

According to the process of the invention the meat is cured in a brine bath containing nitrite ions, while it is being carried through the bath in the form of successive assemblies each of numerous slices, each slice being attached at its lower end only to a carrier arranged to move through the bath while extending transversely to the direction of motion, the lower ends of all the slices of an assembly being at substantially the same level and being spaced along the carrier and overlapping one another stepwise, the slices being totally immersed during substantially the whole of their path through the bath, with their free ends floating upwards and spread apart.

Preferably, after passage through the bath each assembly of slices is drained and removed from the carrier, and the slices, still in overlapping stepwise arrangement, are packaged in bags of air-impermeable plastic, and sealed therein in the substantial absence of free oxygen. After the draining step and before packaging, the slices may be smoked by passing each assembly of slices in turn, while still attached to its carrier, through a chamber supplied with smoke, the slices attached to each carrier preferably hanging freely downwards during passage through the smoke chamber.

The process may include the step of forming the slices by slicing uncured meat in such a way as to form "shingles," that is assemblies of slices laid substantially parallel to each other in stepwise overlapping arrangement, attaching each assembly in turn to a carrier while preserving the said arrangement, each slice being attached to the carrier at the same end and the attached ends of all the slices in an assembly being in line, and feeding each carrier in turn to conveying means carrying it into, through and out of the curing bath. Preferably the slices remain attached to the carriers throughout their travel from the slicing station to the station at which they are packaged, and from that station each carrier in turn is passed through a cleansing bath and returned to the slicing station.

In the process of the invention the fact that the slices are passed through the curing bath in stepwise overlapping arrangement secures considerable economy both in space and in the amount of curing liquor required. It is remarkable that a desirably uniform degree of cure can be obtained in a very short time of passage through the bath in spite of the overlap. This is to be attributed largely to the manner in which, as the slices are moved through the bath, attached by their lower ends only, their free ends float upwards and become spread apart owing to their motion through the bath. It is also remarkable that smoking can also be effected while the slices are in the form of a shingle, the overlap not preventing adequate access of the smoke to the individual slices. These facts and the fact that meat can readily be sliced to form a shingle make it possible to integrate the various steps necessary in converting slices of pig meat into sliced packaged bacon very advantageously into a substantially continuous process, in which the meat is treated throughout in shingle form.

By way of example a preferred method of obtaining packaged cured smoked bacon in the form of slices will now be described with reference to the accompanying diagrammatic drawings, wherein:

FIGURE 1 is a flow diagram representing the overall process,

FIGURE 2 is a part sectional side elevation of a curing unit according to the invention taken in part along the line 2—2 in FIGURE 5, FIGURE 3 is a side elevation of a smoking unit according to the invention, FIGURE 4 is a plan view of the smoking unit.

Figure 5:
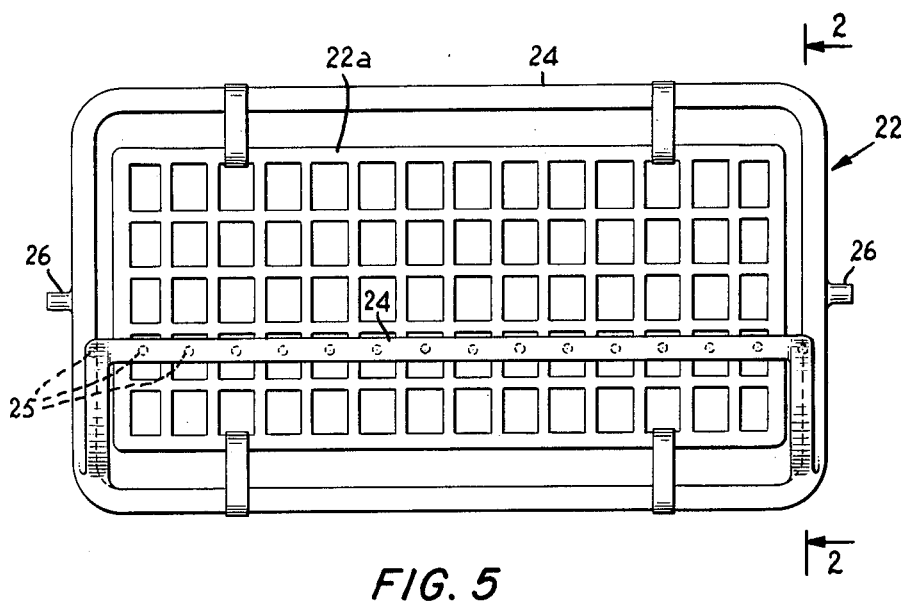
FIGURE 5 is a plan view of one embodiment of the carrier disclosed according to this invention.

Referring now to FIGURE 1, meat is sliced at the cutting station 1 and the slices are deposited in shingle form on a conveyor belt travelling towards the curing bath 2. Before reaching the bath the slices are attached to carriers, each accommodating a shingle of many slices (for example 50 to 150) and are then carried successively through the bath to the draining station 3 and thence through the smoke chamber 4 to the packing station 5 where the slices of bacon are removed from the carriers and packaged in bags of air-impermeable plastic and sealed therein in the substantial absence of free oxygen, preferably by vacuum-packing. The carriers to which the shingles were attached for processing are returned to the cutting station 1 via a cleansing bath 6.

Referring to FIGURE 2: mounted above a curing tank 10 of rectangular cross-section are the driving sprockets 11 and idler sprockets 12 of a pair of conveyor chains 13 each having a lower run along one edge of the bath, between guide rails 14 and 15, and a return run above the bath between guide rails 16 and 17. The chains are connected at regular intervals by transverse bars 18 each of which carries near each end an arm 19 projecting outwardly perpendicular to the bar and having a slot 20 at the end. A pair of reciprocating shafts (not shown) may be located on each side inside the bath, each shaft bearing a number of paddles for agitating the contents of the bath. The conveyor is driven by a variable speed motor 21.

Carriers 22 are provided for holding each shingle 23 of meat slices. Each carrier 22 comprises a supporting grid 22a across which the shingle is laid, and an outer frame 24 carrying an array of projections or pins 25 arranged to be clamped over the grid to anchor the slices laid thereon, each pin 25 passing through the overlap of adjacent slices. The frame has trunnions 26 about which the carrier balances and which fit into the slots 20 in the arms 19. For guiding the carriers into, through and out of the bath there is provided a pair of guide rails 27 one rail being near each side of the bath and being engaged by one of the trunnions of each carrier as that carrier is moved along by the pair of slotted arms engaging the trunnions. For clarity the trunnions in the drawing are shown enlarged and displaced towards one end of the frame.

Referring now to FIGURES 3 and 4: a twin-chain conveyor 40 is provided for carrying the shingles, each attached to its carrier, through a smoke chamber 41. Attached to both chains of the conveyor at regular intervals are transverse arms 42 which extend to one side of the conveyor and are recessed at the end to accommodate the trunnions of the carriers, each arm accommodating one trunnion from each of two carriers, the arrangement being such that both chains of the conveyor are outside the smoke chamber but the arms 42 project into the chamber. Within the smoke chamber is a double-walled smoke dispenser 43, the cross section of which is substantially U-shaped, arranged to permit transverse arms 42 bearing the carriers 22 to pass freely between the inner side walls of the smoke dispenser. The inner side walls of the smoke dispenser 43 both have a number of vertical slots 44 equally spaced apart and the inner bottom wall of the dispenser has a corresponding number of inclined slots 45, these slots serving for the admission of smoke.

The smoke chamber houses an air blast device comprising a horizontal perforated pipe 46 located below the path taken by the carriers and inclined to said path at the same angle as the slots in the bottom of the smoke dispenser. The perforated pipe is connected with a supply of compressed air (not shown). The path taken by a carrier when passing over the perforated pipe is bounded on both sides by a pair of plates 47 arranged in such manner that the entrance 48 to the channel so formed is flared. Flared duct 49, connected with a smoke generator (not shown) and a supply of compressed air (not shown), opens into the base of the smoke dispenser. The means for exhausting smoke from the smoke chamber comprises an extraction fan 50 and smoke exit duct 51.

In operation, at the cutting station pig meat is sliced and the slices are deposited on a conveyor belt in shingle form. Carriers returned from the cleasing bath are each in turn provided with a shingle of slices and the outer frame of each carrier (bearing the anchoring pins), is then clamped over the grid in such manner that each pin passes through the overlap of the tail end of two adjacent slices.

The carrier 22 thus loaded with slices of the pig meat is placed on the guide rails 27 at a loading point 29 outside the bath, with the trunnions of said carrier resting upon the guide rails. Movement of the conveyor chains 13 causes said trunnions to enter the slots 20 of the arms 19 and the trunnions, while moved along by these arms, are guided by the guide rails 27 into, through and out of the bath, which contains a solution 28 of the curing brine. The arrangement is such that during passage through the bath the slices, although completely immersed in the brine and not supported by the carrier to which they are attached, float upwards, the individual slices of the shingle spreading apart while anchored by their lower ends to the carrier.

After leaving the bath each carrier may be transferred to a draining rack (not shown) or to a further conveyor which carries the carrier through a draining zone. Preferably, each carrier during draining is inclined at 45° to the perpendicular in such manner that it supports the slices attached thereto, and guide means may be provided to ensure that the carriers are so inclined on leaving the bath and progressing towards the smoking unit, or towards the packaging unit if smoking be omitted. When the process includes smoking, then, depending on conditions in the smoke chamber and the degree of moisture desired in the product, a specific draining step may be unnecessary since some drying occurs during smoking. On the other hand, a specific drying step may be introduced prior to packaging or to smoking.

The carriers are then conveyed to the smoking unit, where the trunnions of each carrier are fitted into the corresponding recesses in the transverse arms 42 of the conveyor in such manner that the slices of meat, supported by the grid of bars of the carrier, hang substantially vertically downwards. The carrier is kept upright by a supporting arm (not shown) attached to the conveyor. Movement of the twin chain conveyor causes the transverse arms to carry the carrier through the smoke chamber.

Smoke, generated in a furnace fed with a sawdust mixture of oak and a soft wood, is drawn into a stream of air passing through a venturi nozzle and thence through the flared duct 49 to the smoke dispenser 43. The smoke extraction means facilitates the creation of a current of smoke and air between the slots 44, 45 and the extraction means 50, 51, which current traverses the path taken by the carrier.

A shingle of meat slices entering the smoke chamber is thus initially subjected to a blast of air designed to separate the slices from one another and then to the smoke current, the slots in the base of the smoke dispenser particularly aiding further separation of slices from one another.

After leaving the smoke chamber the carriers are transferred, lying flat in such manner that each shingle is supported by the grid of bars of the carrier to which it is attached, to the packaging station where the frame bearing the anchoring pins is removed, the shingle divided into groups of slices of appropriate weight and each group is then enclosed in a bag of air-impermeable plastic which is then vacuum sealed. During sealing of the bags the holes made in the meat slices by the anchoring pins close up.

The following examples illustrate the invention:

*Example 1*

Using the apparatus described above in the manner described, shingles each consisting of approximately 100 slices of a cut of pig meat that when cured yields streaky bacon, each slice having a thickness of about 3 mm., were carried through the curing bath which contained a treating solution comprising 22% weight/volume of sodium chloride and 0.1% weight/volume of sodium nitrite. (In this specification "% weight/volume" means grams of the specified solute per 100 millilitres of solution.) The temperature of the solution in the bath was 20° C. The time taken for the shingle to pass through the bath was 4 minutes.

The shingle was drained for 4 minutes before being transferred to the conveyor of the smoking unit. The shingle was conveyed through the smoke chamber in which it encountered the smoke/air mixture issuing from the slots of the smoke dispenser.

The conveyor was driven at such speed that each carrier took 1 minute to pass through the smoke chamber.

The shingle removed from each carrier was divided into smaller shingles each of which was vacuum sealed in Saran-coated cellophane/polythene laminate bags and was kept at atmospheric temperature for 4 hours to accelerate colour development and then stored at 2 to 5° C. until required.

Example 2

The process was carried out as described in Example 1 except that the curing bath contained in addition 0.1% weight/volume of sodium nitrate. This provides in the product a reservoir from which further supplies of nitrite ion can be supplied by microbiological reduction during the shelf life of the product.

It will be appreciated that when a smoked product is not required, or if, for any reason, smoking has been effected before slicing, the smoking step can be omitted from the sequence of operations described.

It is thought to be broadly novel to smoke meat in slice form as a continuous process in which successive assemblies each of numerous slices of meat are moved through a smoke chamber, the slices in each such assembly being substantially parallel and being anchored at one end so as to hang downwards with corresponding edges overlapping, the direction of movement through said chamber being substantially parallel to the slices, and smoke being continuously supplied to the lower part of said chamber and drawn off from the upper part thereof after passing across the path along which the assemblies move.

As indicated, a very desirable feature of the method includes subjecting the shingle, at least near the entrance to the smoke chamber, to blasts of air directed to separate the slices from one another.

The method of smoking can be modified in various ways. Instead of the slices hanging downwards during passage through the smoke chamber they can be passed through it in the form of shingles lying flat on the carriers, which in this case are moved through the smoke chamber while positioned horizontally, the direction in which the smoke impinges on the slices being appropriately modified, for instance by blowing the smoke horizontally over the slices. Electro-static means can also be applied to further deposition of smoke particles on the slices, for instance by charging the smoke particles before they enter the smoke chamber and/or by imparting an electro-static charge to the slices. By these methods also the slices may be treated in shingle form, the shingles lying flat on the carriers or hanging downwards therefrom.

To obtain firm slices of meat to be cured, the sides of meat are preferably chilled, for example, in the case of pig meat to about −2° C. Generally, the thickness of slices of meat used is from about 2 mm. to 8 mm., but slices of thickness up to 25 mm. have been treated according to the invention and slices of even greater thickness, for example 40 mm., can be processed. Although the invention finds its most important application in making bacon from rashers cut from sides of pig meat it may be used in a similar way in making bacon-like products from meat of a different kind, for instance from suitable cuts of mutton. Moreover the slices treated may be cut at a suitable temperature from a block of meat formed by forcing the raw meat into a mould.

The temperature of the brine is not highly critical: it may be in the region of room temperature, considerably lower than room temperature (for example 0° C.), or above room temperature (for example 55° C.) provided that undesirable effects such as excessive melting of the fat or denaturation of the protein are not produced.

The brine solution used in curing according to the invention is preferably one containing from 10 to 32% weight/volume, of salt and from 0.005 to 1%, preferably 0.05 to 0.2% weight/volume, of nitrite ions, with or without a small proportion, which may be of the same order as that of the nitrite, of nitrate ions. Sodium nitrite is the preferred source of the nitrite ions.

The time of curing treatment may vary according to slice thickness, concentration and temperature of brine. Generally speaking, at temperatures between 10 and 25° C. the time of treatment required for slices of a particular thickness does not vary to any marked degree.

It is desirable for the slices to be packaged and sealed as soon as possible after curing (or after smoking when this follows curing). As indicated above, free oxygen should be substantially removed before sealing. The air can be displaced from the containers by means of an inert gas such as nitrogen, but conveniently air is removed by the application of sub-atmospheric pressure.

Suitable containers include those made from a heat-sealable substantially impermeable thermoplastic film, such as polyethylene or a laminate of cellophane and polyethylene or better still of polyethylene and a regenerated cellulose foil such as cellophane, coated with a vinylidene chloride polymer such as Saran.

When free oxygen is carefully excluded and highly gas-impermeable material is used for the package the characteristic flavour and pinkish colour of bacon is normally developed at room temperature within 4 to 8 hours after packing.

A cooking treatment may be given to the cured meat slices in the package. Thus the process may be applied to the preparation of ham.

The invention includes apparatus suitable for carrying out the process of the invention, comprising a bath for holding the curing brine, a plurality of carriers provided with means for attaching slices of the meat thereto each by one end in substantially parallel, stepwise arrangement, with the attached ends of all the slices in line, and means for moving a series of said carriers in spaced relationship into, through and out of the bath, the carriers while travelling through the bath extending transversely to their direction of motion and with the means for attachment of the slices directed downwards.

Preferably each carrier comprises an inner frame having a grid of bars arranged to provide support for slices of meat laid thereon and an outer frame 23b adapted to receive the inner frame 23a, said outer frame 23b having a series of pins 25 or the like capable of anchoring the meat slices laid on the inner frame 23a.

As indicated above, in a preferred arrangement the bath is provided with guide rails for guiding the carriers into, through and out of the bath, each carrier is provided with trunnions for engaging said guide rails and the means for moving the carriers through the bath comprise a pair of conveyor chains each having a lower run along one edge of the bath and a return run above the bath, a plurality of transverse bars at regular intervals connecting the two chains and, near each end of each transverse bar an arm projecting outwardly perpendicular to the bar and having a slot at the end to accommodate one of the trunnions of a carrier, the arrangement being such that when a carrier loaded with its assembly of meat slices is suitably placed with its trunnions supported by the guide rails at the inlet end of the bath and the conveying means are operated, a pair of the said arms engages by the slots in its ends the trunnions of the carrier, moves the carrier along the guide rail into and through the bath with the points of attachment of the meat slices directed downwards and at the end of the bath moves said carrier upwards and out of the bath to a draining station.

The invention also includes apparatus suitable for smoking meat in the form of slices, which comprises a smoke dispenser, adapted to receive a supply of smoke from a smoke generator, encased in a smoke chamber provided with smoke exhaust means, the arrangement being such that the smoke path in the smoke chamber passes between the smoke dispenser and the smoke exhaust means, and means for moving carriers through said smoke chamber in such manner that the path of the carriers passes through said smoke path.

Preferably the smoke dispenser is a long-double walled vessel having a substantially U-shaped cross section, the inner walls of which are provided with vertical slots in the side walls and horizontal slots in the bottom wall for admission of the smoke. It has been found that particularly good results are obtained if the slots in the bottom wall are inclined at an angle to the direction of travel of the carriers. The best results have been obtained when, viewed from the direction of travel of the carrier, the inclined slots make an angle of 60° with the line of said direction.

The smoke apparatus of the present invention desirably includes, preferably at a point near the entrance to the smoke dispenser, means for subjecting the slices of meat to blasts of air. Suitably, said means comprise a perforated air pipe horizontally positioned under the path of the conveyor, the arrangement being such that an air stream which issues from the perforations passes across the path of the conveyor.

The invention further includes a complete apparatus suitable for converting sides of pig meat into packaged, sliced bacon by a substantially continuous process, which comprises the combination in series of a slicing unit arranged to slice the meat so as to provide assemblies of numerous substantially parallel slices in stepwise overlapping arrangement, a curing unit of the kind specified above, for curing the assemblies of slices by causing carriers to which they are attached to progress through a curing bath, means for removing the carriers from the curing bath and allowing the slices attached thereto to drain, and a packaging unit for packaging assemblies of slices after their removal from the carriers, in bags of air-impermeable plastic in the absence of free oxygen. Such apparatus may with advantage include means for conveying carriers along a return path from the point at which the cured meat is removed from them for packaging, to the region in which the assemblies of slices are attached to carriers preparatory to entering the curing bath, and means situated along said return path for cleansing the carriers.

As indicated above, there may be included between the curing unit and the packaging unit a smoking unit comprising a smoke chamber and means for causing the carriers to which the assemblies of cured slices are attached to pass progressively through said chamber towards the packaging unit. The smoking unit may comprise a long double walled vessel of substantially U-shaped cross-section, the inner walls of which are provided with vertical slots in the side walls and horizontal slots in the bottom wall for the admission of smoke, in combination with conveying means adapted to move the carriers through the inner compartment of the vessel with the slices of each assembly hanging freely downwards.

We claim:

1. Apparatus for curing meat comprising a bath capable of holding curing brine in a predetermined level, a plurality of carriers each having a grid suitable for supporting flexible, thin, elongated slices of meat and having an outer frame attached to said grid with fastening projections capable of anchoring to said grid the meat slices laid thereon, and means for moving a series of the carriers in a spaced relationship downwardly into the bath, through the bath at a low level with the fastening projections being at a depth below the predetermined level which is greater than the length of the longest slices of meat, and upwardly out of the bath.

2. Apparatus for curing meat as defined in claim 1 further comprising guiding means operable with said moving means for establishing each of said plurality of carriers in an inclined attitude as it moves through and out of the bath, said slices of meat being attached to the inclined upper surface of each of said carriers, adjacent the leading edge of said carrier, whereby the slices of meat are free to float upwardly within said brine and are also supported throughout their length in an inclined position to facilitate drainage and drying when removed from said bath.

3. Apparatus according to claim 1, wherein the bath is provided with guide rails for guiding the carriers into, through and out of the bath, wherein each carrier is provided with trunnions for engaging said guide rails and wherein the means for moving the carriers through the bath comprise a pair of conveyor chains each having a lower run along the lower edge of the bath and a return run above the bath, a plurality of transverse bars at regular intervals connecting the two chains and, near each end of each transverse bar an arm projecting outwardly perpendicular to the bar and having a slot at the end to accommodate one of the trunnions of a carrier, the arrangement being such that when a carrier loaded with its assembly of meat slices is suitably placed with its trunnions supported by the guide rails at the inlet end of the bath and the conveying means are operated, a pair of the said arms engages by the slots in its ends the trunnions of the carrier, moves the carrier along the guide rail into and through the bath with the points of attachment of the meat slices directed downwards and at the end of the bath moves said carrier upwards and out of the bath to a draining station.

References Cited by the Examiner

UNITED STATES PATENTS

| Re. 14,965 | 10/1920 | Bilderback | 99—259 |
|---|---|---|---|
| 1,534,867 | 4/1925 | Peschke et al. | 99—261 |
| 1,776,072 | 9/1930 | Jordan | 99—262 |
| 1,953,300 | 4/1934 | Holman. | |
| 1,976,448 | 10/1934 | Lawler | 99—254 X |
| 2,461,291 | 2/1949 | McKee | 99—159 |
| 2,469,026 | 5/1949 | Barstad | 99—261 |
| 2,542,382 | 2/1951 | Vucassovich | 99—254 |
| 2,627,473 | 2/1953 | Brissey | 99—159 X |
| 2,880,663 | 4/1959 | Simjian | 99—254 |
| 2,902,369 | 9/1959 | Komarik | 99—159 |
| 2,973,277 | 2/1961 | Barnett et al. | |
| 2,974,047 | 3/1961 | Holmes | 99—159 X |
| 3,049,428 | 8/1962 | Hopkins. | |

FOREIGN PATENTS 22,880  12/1912  Norway.

ROBERT E. PULFREY, Primary Examiner.

H. LORD, JEROME SCHNALL, Examiners.